(12) United States Patent
Young

(10) Patent No.: US 7,694,185 B2
(45) Date of Patent: Apr. 6, 2010

(54) METHOD AND APPARATUS FOR PROVIDING SIMPLIFIED CONTROL FOR DEVICE FAULT AND EVENT HANDLING

(75) Inventor: Yuan-Yuan Young, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 386 days.

(21) Appl. No.: 11/697,061

(22) Filed: Apr. 5, 2007

(65) Prior Publication Data

US 2008/0250048 A1   Oct. 9, 2008

(51) Int. Cl.
*G06F 11/00* (2006.01)
(52) U.S. Cl. ...................................................... 714/41
(58) Field of Classification Search .................. 714/25, 714/31, 37, 38, 40, 41, 45, 46, 48, 56, 57
See application file for complete search history.

(56) References Cited

U.S. PATENT DOCUMENTS

| 6,286,015 | B1 * | 9/2001 | Govindarajan et al. | 707/201 |
| 7,181,383 | B1 * | 2/2007 | McGaughy et al. | 703/14 |
| 7,243,330 | B1 * | 7/2007 | Ganesan et al. | 716/18 |
| 7,263,605 | B2 * | 8/2007 | Rothman et al. | 713/2 |
| 7,328,374 | B2 * | 2/2008 | Alexander et al. | 714/42 |
| 7,546,487 | B2 * | 6/2009 | Marisetty et al. | 714/27 |
| 2008/0148231 | A1 * | 6/2008 | Weber | 717/120 |

\* cited by examiner

*Primary Examiner*—Nadeem Iqbal
(74) *Attorney, Agent, or Firm*—Larry T. Cullen

(57) ABSTRACT

A method identifies, prior to runtime, a first device that is added to a system. Further, the method generates, prior to runtime, a statically precompiled database for the device that provides a first set of error handling data. In addition, the method identifies, during runtime, a second device that is added to the system. Finally, the method generates, during runtime, a dynamically allocated database for the second device that provides a second set of error handling data.

19 Claims, 7 Drawing Sheets

200

Table for Hardware Device Interface

202 — Error X

| | | |
|---|---|---|
| Error X | Event Error ID | Event Error ID X' |
| | Event Control Type | Event Control Type X' |
| | Thresh Count, Reset Count, Timer Count | Thresh Count X', Reset Count X', Timer Count X' |
| | Error Message | Error Message X' |
| | Alarm Event Generation Control | Alarm Event Generation Control X' |
| Error Y | Event Error ID | Event Error ID Y' |
| | Event Control Type | Event Control Type Y' |
| | Thresh Count, Reset Count, Timer Count | Thresh Count Y', Reset Count Y', Timer Count Y' |
| | Error Message | Error Message Y' |
| | Alarm Event Generation Control | Alarm Event Generation Control Y' |
| Error Z | Event Error ID | Event Error ID Z' |
| | Event Control Type | Event Control Type Z' |
| | Thresh Count, Reset Count, Timer Count | Thresh Count Z', Reset Count Z', Timer Count Z' |
| | Error Message | Error Message Z' |
| | Alarm Event Generation Control | Alarm Event Generation Control Z' |

204 — Error Y
206 — Error Z

*Figure 2* ated with each of the devices. In one embodiment, the system 100 statically allocates a pre-defined table data structure for each interface during system initialization, i.e., prior to runtime. In another embodiment, the system 100 dynamically allocates a table data structure during system run-time through the table driven algorithm. Accordingly, memory is allocated dynamically as devices that are newly added, i.e., added after system initialization, are discovered. In yet another embodiment, the system 100 may utilize a combination of static allocation prior to run-time and dynamic allocation during run-time. For example, a first device that is added to the system prior to runtime can be provided with a statically pre-compiled database that provides a first set of error handling data in a first tabular format while a second device that is added to the system during runtime can be provided with a dynamically allocated database that provides a second set of error handling data in a second tabular format.

METHOD AND APPARATUS FOR PROVIDING SIMPLIFIED CONTROL FOR DEVICE FAULT AND EVENT HANDLING

RELATED APPLICATIONS

This application claims priority to U.S. Provisional Application Ser. No. 60/777,731 entitled "Method and Apparatus for Providing Simplified Control for Device Fault and Event Handling," filed on Feb. 28, 2006, the content of which is incorporated herein by reference in its entirety.

BACKGROUND

1. Field

This disclosure generally relates to the field of systems. More particularly, the disclosure relates to device error and fault handling.

2. General Background

Most embedded computerized systems include a number of devices that are focused on specialized functionalities for a particular system. The devices may be hardware devices such as a set top box, cable modem, or any other hardware device known to one skilled in the art. Further, the devices may also be software components that are added to the system.

Software development for an embedded computerized system may involve controlling and configuring the hardware components within a device to interpret the incoming radio frequency ("RF") signals and generate signals in MPEG2 format for television broadcasting. However, any of the hardware components can degenerate or malfunction. As a result, a hardware component may not perform the intended functionality. A safe run of the hardware devices can be performed to test whether the hardware devices are operating properly. For instance, an internal auditing task may continuously run in the background to assess the health status of a hardware device. If a faulty hardware device is detected, the reporting of the error to the end user may be very complicated based on the number of errors that could be the cause of the hardware device not working properly.

Event though a software project is essentially complete once the core software code has been developed, the time frame for device fault and event handling is often significant. Further, significant additional resources are often needed for analysis and preparation of code for the device fault and event handling.

SUMMARY

In one aspect of the disclosure, a method is disclosed. The method identifies, during runtime, a device that is added to a system. Further, the method generates, during runtime, a dynamically allocated database for the device that provides error handling data in a tabular format.

In another aspect, a method is disclosed. The method identifies, prior to runtime, a first device that is added to a system. Further, the method generates, prior to runtime, a statically precompiled database for the device that provides a first set of error handling data. In addition, the method identifies, during runtime, a second device that is added to the system. Finally, the method generates, during runtime, a dynamically allocated database for the second device that provides a second set of error handling data.

In yet another aspect, a method is disclosed. The method identifies, prior to runtime, a first device that is added to a system. Further, the method generates, prior to runtime, a statically precompiled database for the device that provides a first set of error handling data in a first tabular format. In addition, the method identifies, during runtime, a second device that is added to the system. Finally, the method generates, during runtime, a dynamically allocated database for the second device that provides a second set of error handling data in a second tabular format.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 2 illustrates a table generated for a hardware interface to provide device fault and event handling.

DETAILED DESCRIPTION

A method and apparatus are disclosed, which provide simplified control for device fault and event handling. The method and apparatus may be utilized to simplify the often complicated and tedious task of handling a potentially enormous number of errors that could occur within the system. A table driven algorithm is utilized to handle the control of fault and the recovery. As a result, the amount of coding for identifying the hardware origin of an error, deciding the appropriate time to act on the error, executing the error, and recovering from the error in all of the potential error scenarios is reduced.

Figure 1:
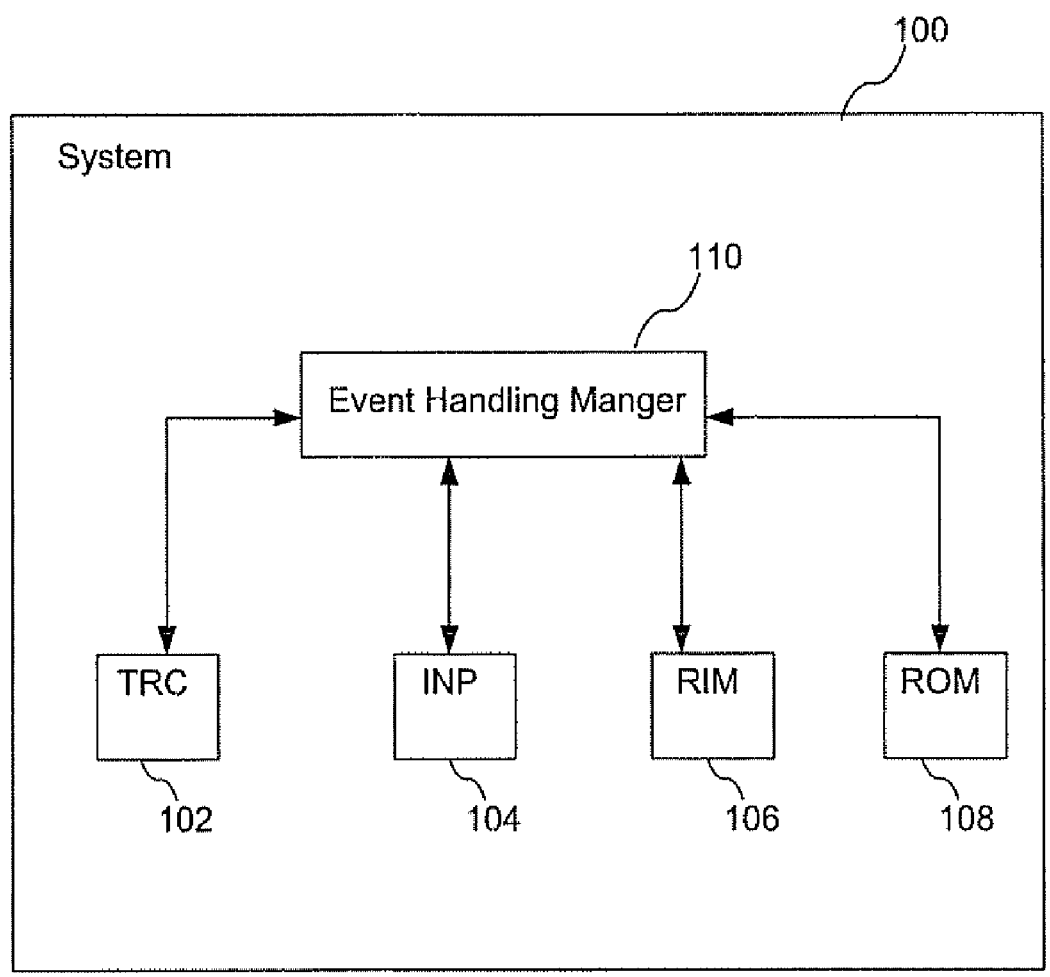
FIG. 1 illustrates a system that utilizes a plurality of devices.

FIG. 1 illustrates a system 100 that utilizes a plurality of devices. An example of the system 100 is the Motorola TMX-2010 Transcoder Multiplexer. Amongst the devices are a TRansCoding board ("TRC") 102 that has Digital Signal Processors ("DSPs") that compress video input in a compact format to save bandwidth usage, a Transport stream INPut board ("INP") 104, a Rear Input Module board ("RIM") 106, and a Rear Output Module board ("ROM") 108. One of ordinary skill in the art will recognize various other hardware devices that are utilized in like systems. For example, the system 100 may also have a multiplexer ("MUX") DSP board.

A table having a pre-defined data structure type may be created for each of the hardware devices. A pre-defined data structure type may be composed for each of the hardware interfaces supported by the system 100. Accordingly, the utilization of a table for each of the devices allows errors to be grouped for each of the identified hardware devices. As a result, device fault and event handling issues can be systematically resolved more quickly and with fewer resources.

During the system power up sequence, the system 100 discovers each of these devices and a corresponding interface for the respective device. Each of the discovered device interfaces registers itself with an event handling manager 110 in the system 100. The event handling manager 110 can be implemented as a task, thread, process, module, component, etc. in the system 100. Once a device is registered, the pre-defined table for the hardware interface corresponding to the device is retrieved. A copy of the pre-defined table is then generated. Further, the copy of the pre-defined table is then populated with known values for handling all the potential errors for the particular hardware interface.

FIG. 2 illustrates a table 200 generated for a hardware interface to provide device fault and event handling. In one embodiment, all of the potential errors that may occur for the particular hardware interface are pre-defined in the table 200. For instance, the table 200 has the following predefined potential errors: error X 202, error Y 204, and error Z 206. A set of predefined fields is provided for each potential error. In one embodiment, the set of predefined fields includes: (1) event error id; (2) event control type; (3) thresh count, reset count, and timer count; (4) error message; and (5) alarm event. The event error id is an identification for the error. Further, the event control type is a control error controlled by threshold or timer. In addition, the thresh count, reset count, and timer count are utilized by the event control type to determine when to set the error and when to reset the error based on threshold or timer counts. The error message is the error that is displayed when the error threshold is reached. Finally, the alarm event generation control is a flag that determines the type of errors to generate, e.g., minor, warning, or critical. The alarm generated can be a single alarm or a combined alarm for events as defined in the table 200. Whenever the error threshold is reached, the alarm event goes up one level until the critical level is reached. When the reset threshold is reached, the alarm event control goes down one level until the alarm is cleared. Accordingly, the table 200 provides the set of predefined fields for each of the potential errors, e.g., error X 202, error Y 204, and error Z 206, for a particular hardware interface.

The table 200 also has a set of known values that are populated for each of the predefined fields corresponding to an error and a hardware interface. For instance, the event error id X', event error id X', thresh count X', reset count X', timer count X', error message X', and alarm event X' are known values that are populated for the potential error X for the particular hardware interface. As a result, a set of events to identify and correct the potential error X 202 is preplanned. Similarly, sets of events can be preplanned to identify and correct the potential error Y 204 and the potential error Z 206. If a distinct table is generated for a different hardware interface that also has the potential error X 202, a different set of known values, e.g., event error id X", event error id X", thresh count X", reset count X", timer count X", error message X", and alarm event X", may be utilized to deal with the particular nuances of that hardware interface.

The predefined fields in the table 200 are utilized because they provide helpful information to simplify control for device fault and event handling. In another embodiment, additional or different fields may be utilized.

In yet another embodiment, a subset of all the potential errors that may occur for the particular hardware interface is pre-defined in the table 200. A subset may be utilized because of the difficulty in identifying all the potential errors or size constraints for storing a large number of potential errors.

In one embodiment, a table is generated for each identified hardware interface. Accordingly, the pre-defined data structure for one hardware interface may be different than another hardware interface. In other words, a different set of errors and values may be pre-defined and populated for different hardware interfaces.

Figure 3:
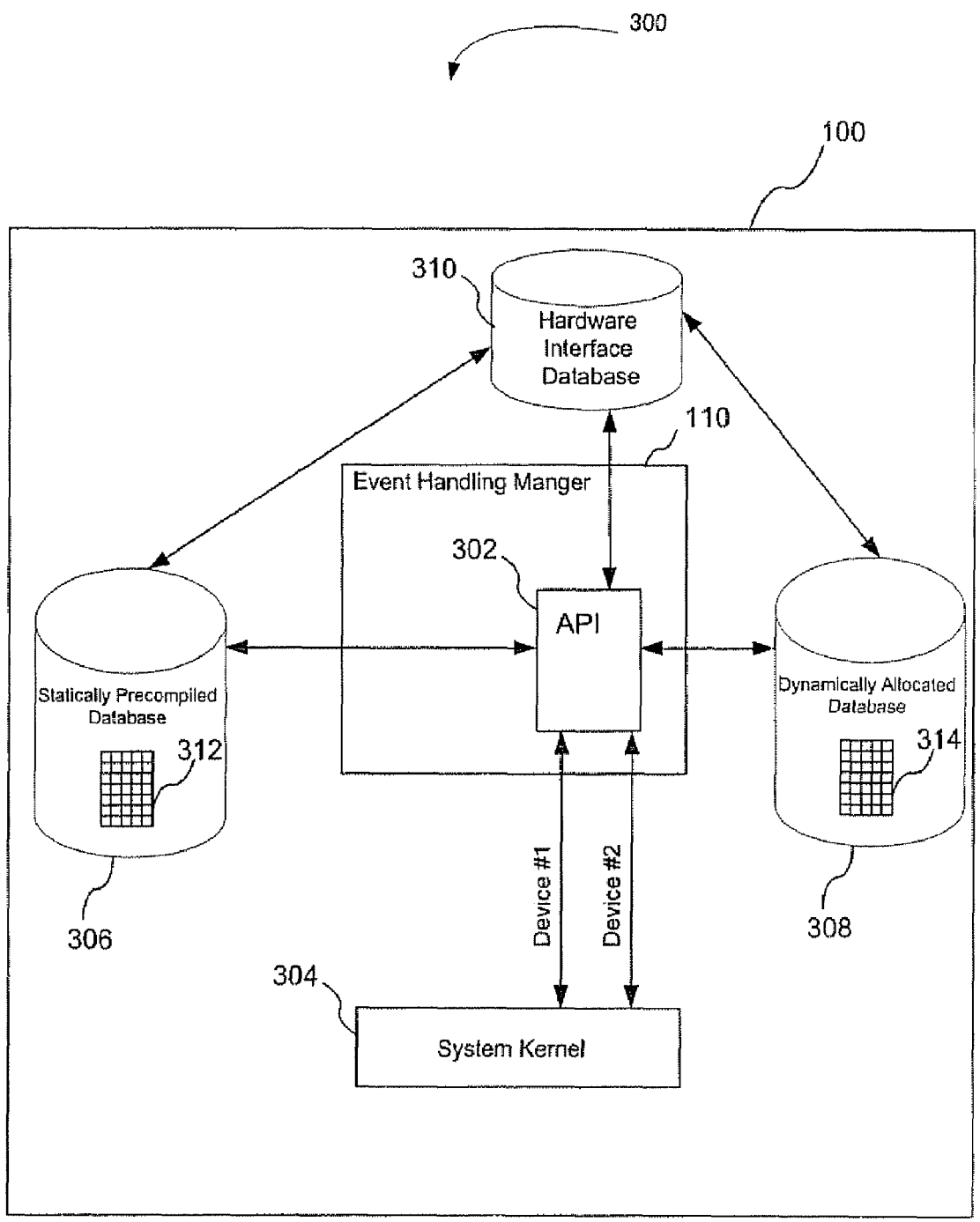
FIG. 3 illustrates a configuration in which the event managing handler, as illustrated in FIG. 1, may be utilized to coordinate the system fault handling for the devices of the system through the table mechanism.

FIG. 3 illustrates a configuration 300 in which the event managing handler 110, as illustrated in FIG. 1, may be utilized to coordinate the system fault handling for the devices of the system 100 through the table mechanism. The event managing handler 110 may provide an Application Programming Interface ("API") 302 and task for the other module tasks residing on the system kernel 304 to handle the potential hardware and/or software detected errors. Further, the event handling manager 110 provides flexibility through the static configuration of the software run-time execution and the dynamical configuration of installed hardware devices. For instance, a statically precompiled database 306 may be utilized for hardware device that has a fixed configuration where as a dynamically allocated database 308 may be utilized for new hardware identified at system power up. In one embodiment, the statically precompiled database 306 and the dynamically allocated database 308 are distinct databases that are stored in the same storage medium. In another embodiment, the statically precompiled database 306 and the dynamically allocated database 308 are distinct databases that are stored on distinct storage media.

In one embodiment, the event managing handler 110 composes a table for each hardware device and stores the table in the statically precompiled database 306 or the dynamically allocated database 308. The table lists the potential errors for the hardware device. The event managing handler 110 utilizes routines in the API 302 to compose a table for a hardware device with a fixed configuration. The event managing handler 110 retrieves data for the particular hardware device with the fixed configuration from a hardware interface database 310. In one embodiment, the event managing handler 110 retrieves the data by calling a routine in the API 302. The event managing handler 110 then predetermines events and corresponding responses for errors of the particular hardware device with the fixed configuration. Finally, the event managing handler 110 composes a table 312 with the predetermined events and corresponding responses for storage in the statically precompiled database 306.

The API 302 may have various routines that may be utilized by the event managing handler 110 and/or module tasks in the system kernel 304. For example, a routine entitled "EVENT_MGR_CPU_REGISTER" may be utilized to associate the statically precompiled database 306 with a central processing unit ("CPU") hardware database. In one embodiment, the statically precompiled database 306 is a static error tracking and error responding database predefined at compiling time. Accordingly, the EVENT_MGR_CPU_REGISTER routine may be utilized to associate the statically precompiled database with the CPU hardware database for tracking down runtime software errors. In addition, a routine entitled "EVENT_MGR_CPU_RESOURCE_REGISTER" may be utilized to associate the statically precompiled database 306 with a CPU resource hardware database to control the operational state of the system 100 initiated by the user. Other and/or different routines may be utilized as the routines are provided above for illustrative purposes. Further, a routine entitled "EVENT_MGR_ALARM_PANEL_REGISTER" may be utilized to associate the statically precompiled database 306 with the components of an Alarm Panel hardware database to track down errors detected against Alarm Panel hardware.

Conversely, the event managing handler 110 may also utilize routines in the API 302 to compose a table for a hardware device having an interface discovered at the time of system power up. At the time of system power up, the event managing handler 110 identifies any newly added devices to the system 100 and retrieves data the particular hardware device during runtime from the hardware interface database 310. In one embodiment, the event managing handler 110 retrieves the data by calling a routine in the API 302. The event managing handler 110 then predetermines events and corresponding responses for errors of the particular newly added hardware device. Finally, the event managing handler 110 composes a table 314 with the predetermined events and corresponding responses for storage in the dynamically allocated database 308.

The API 302 may also have various routines to register newly identified hardware devices. For example, the API 302 may have a routine entitled "EVENT_MGR_MUX_REGISTER" that is utilized when a multiplexer ("MUX") DSP is discovered. In one embodiment, the dynamically allocated database 308 is a dynamic error tracking and error responding database generated at runtime when a particular device is discovered. The EVENT_MGR_MUX_REGISTER routine may be utilized to register the dynamically allocated database 308 for the particular MUX DSP. In another embodiment, multiple copies of the dynamically allocated database 308 may be utilized for multiple devices, such as multiple MUXs or any other device. The API 302 may also have a routine entitled "EVENT_MGR_QLP_REGISTER" that is utilized when a QuantiLization Processor ("QLP") DSP is discovered. The EVENT_MGR_QLP_REGISTER routine may be utilized to register the dynamically allocated database 308 for the particular QLP DSP. Further, the API 302 may also have a routine entitled "EVENT_MGR_TPE_REGISTER" that is utilized when a Transcoding Processing Element ("TPE") is discovered. The EVENT_MGR_TPE_REGISTER routine may be utilized to register the dynamically allocated database 308 for the particular TPE DSP. In addition, the API 302 may also have a routine entitled "EVENT_MGR_INP_REGISTER" that is utilized when an input board is discovered. The EVENT_MGR_INP_REGISTER routine may be utilized to register the dynamically allocated database 308 for the particular input board DSP.

Further, the API 302 may provide routines that are potentially accessed for both the statically precompiled database 306 and the dynamically allocated database 308. For example, the API 302 may have a routine entitled "EVENT_MGR_MSG_FOUND" that may be utilized as the entry point for the error handling and responding. Each error is updated to its own database, e.g., the statically precompiled database 306 or the dynamically allocated database 308 for the corresponding device. The accumulated error counts are checked against a predefined threshold. Increased severity level is raised each time the predefined threshold is reached, and the corresponding device database is updated. When the error reaches an allowed severity level, a predefined message is generated and sent to all the devices that are listening. A corrective action may also be taken to prevent the system 100 from malfunctioning.

As an example, an interface for a first hardware device may be detected by the event managing handler 110 prior to runtime. Further, the event managing handler 110 determines that the first hardware device has a fixed configuration. Accordingly, the event managing handler 110 may construct a table 312 for the first hardware device by searching through the hardware interface database 310 and generating the statically precompiled database 306 with the table 312. Further, a registration is performed to link the hardware interfaced database 310 with the statically precompiled database 306. In another embodiment, the statically precompiled database 306 already exists, and the event managing handler 110 adds the table 312 to the existing statically precompiled database 306. At a time when an error for the first hardware device is encountered, the event managing handler 110 may retrieve the predetermined response for the predetermined event from the table. A module task in the system kernel 304 may call a routine from the API 302 that is provided to the module task by the event managing handler 110 to initiate the predetermined response for the predetermined event indicated in the table.

Further, an interface for a second hardware device may be detected by the event managing handler 110 during runtime. The event managing handler 110 detects a new interface for a hardware device during system power up. Accordingly, the event managing handler 110 may construct a table 314 for the second hardware device by searching through the hardware interface 110 and generating, during runtime, the dynamically allocated database 308. Further, a registration is performed to link the hardware interfaced database 310 with the dynamically allocated database 308. At a time when an error for the second hardware device is encountered, the event managing handler 110 may retrieve the predetermined response for the predetermined event from the table 314. A module task in the system kernel 304 may call a routine from the API 302 that is provided to the module task by the event managing handler 110 to initiate the predetermined response for the predetermined event indicated in the table.

In one embodiment, the errors detected by the system 100 may be posted to a task, e.g., a task entitled "eventMgrTask." The error code from the faulty module is utilized by the eventMgrTask to update the database of the module, raise the severity, post the offending alarm to the corresponding hardware interface database, and communicate to the peer device if the module becomes non-operational.

Various data structures may be utilized to implement the databases and table discussed above. The following code is provided for illustrative purposes of code that may be utilized for the data structures and flow control:

```
EventDataTable
typedef struct EVENT_DATA_TABLE
{
    int              eventStatusId;
    EventStatusConst *pEventStatusConst;
    EventErrorsConst *pEventErrorsConstTable;
    EventStatusData  *pEventStatusDataTable;
} EventDataTable;
EventStatusConst
typedef struct EVENT_STATUS_CONST
{
    int  eventErrorRepeatType;
    int  trapEventId;
    int  threshConst;
    int  resetConst;
    int  timerConst;
    char errorMsg[ERR_BUFFER_MAX];
} EventStatusConst;
EventErrorConst
typedef struct EVENT_ERRORS_CONST
{
    int  errorId;
    int  eventCtlType;
    int  trapEventGenerationCtl;
} EventErrorsConst;
EventStatusData
typedef struct EVENT_STATUS_DATA
{
    int                 eventStatusIsOn;
    EventBitErrorDataList *pEventBitErrorDataList;
    EventErrorsData       *pEventErrorDataTable;
    EventBitErrorMsgHandle *pEventBitErrorMsgHandle;
} EventStatusData;
EventBitErrorDataList
typedef struct EVENT_BIT_ERROR_DATA_LIST
{
    int                            eventBitErrorBitId;
```

-continued

```
EventErrorsData              eventErrorsData;
struct                       *pNextEventBitErrorData;
    EVENT_BIT_ERROR_DATA_LIST
} EventBitErrorDataList;
EventErrorsData
typedef struct EVENT_ERRORS_DATA
{
    int             errorBitPatten;
    int             accumCount;
    int             resetCount;
    int             timerCount;
    int             currentMode;
    struct timespec registerTimeStamp;
} EventErrorsData;
EventBitErrorMsgHandle
typedef struct EVENT_BIT_ERRORS_MSG
{
    char            errorBitMsg[80];
    int             trapEventId;
    int             trapEventGenerationCtl;
} EventBitErrorMsgHandle;
Flow Control
    findEventStatusDataTable( )
    doEventHandle( )
        resetThresholdEvent( )
            doResetThresholdEvent( )
            mapEventModeToLogLevel
            updateUnitStateAlarmStatus( )
            updateIdentIfAlarmStatus( )
            adjustDspErrorCode( )
            executeLogMessage( )
            requestTmxSpecificTrap( )
            informRdnOfEvent( )
            generateTmxSpecificTrap( )
            doAlarmPanelReset( )
        setThresholdEvent( )
        aggregateEventBitErrorDataList( )
            findDuplicate( )
        handleDynamicType( )
        doSetThresholdEvent( )
            mapEventModeToLogLevel( )
            updateUnitStateAlarmStatus
            updateIdentIfAlarmStatus( )
            adjustDspErrorCode( )
            executeLogMessage( )
            requestTmxSpecificTrap( )
            informRdnOfEvent( )
            generateTmxSpecificTrap( )
            doAlarmPanelHandle( )
```

Figure 4:
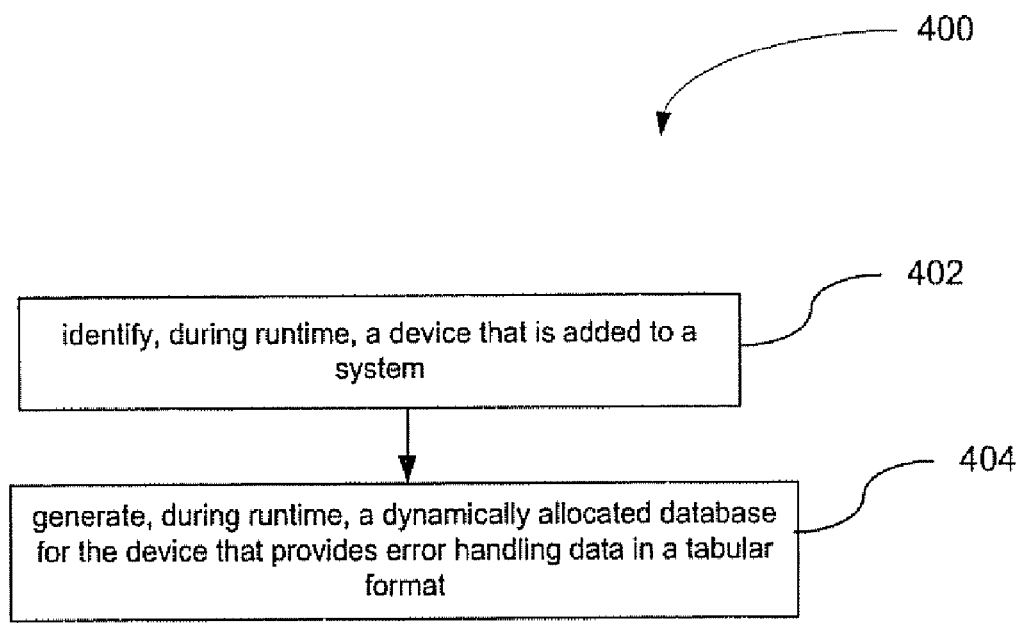
FIG. 4 illustrates a process that generates a dynamically allocated database.

FIG. 4 illustrates a process 400 that generates a dynamically allocated database. At a process block 402, the process identifies, during runtime, a device that is added to a system. Further, at a process block 404, the process 400 generates, during runtime, a dynamically allocated database for the device that provides error handling data in a tabular format. In one embodiment, the tabular format is the table 200, as shown in FIG. 2.

Figure 5:
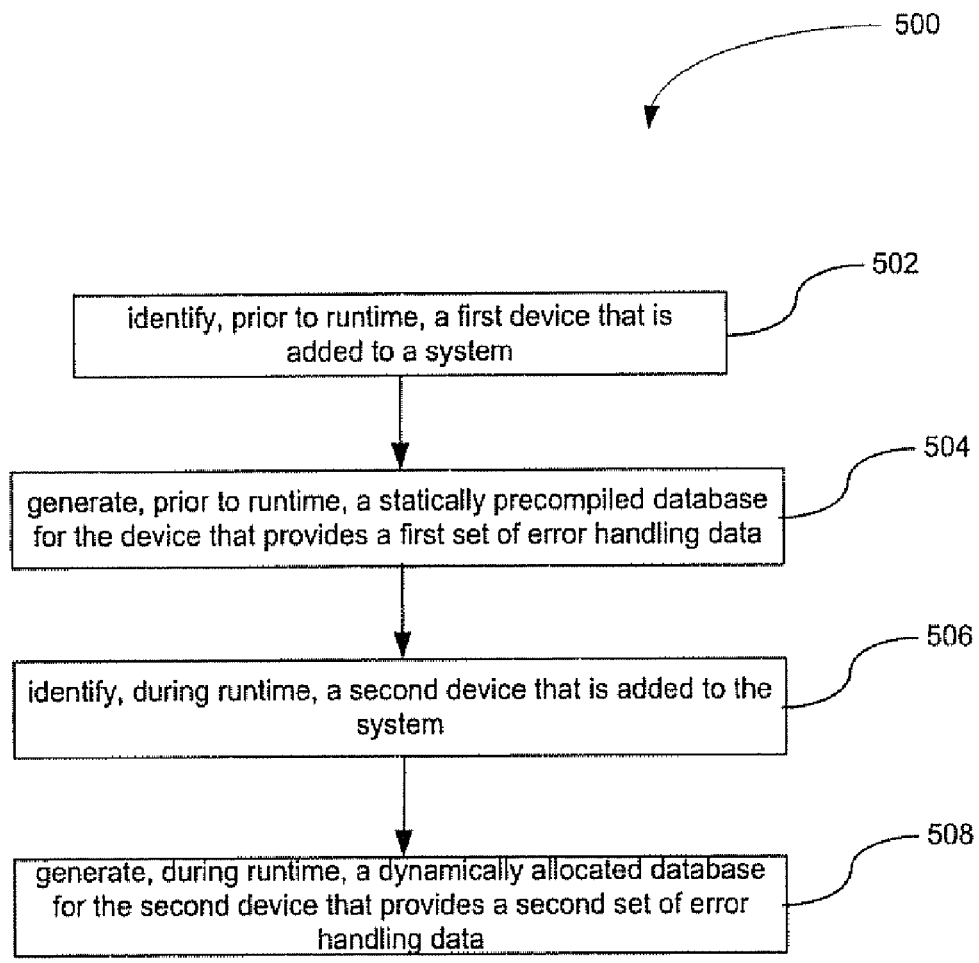
FIG. 5 illustrates a process that generates a statically precompiled database and a dynamically allocated database.

FIG. 5 illustrates a process 500 that generates a statically precompiled database and a dynamically allocated database. At a process block 502, the process 500 identifies, prior to runtime, a first device that is added to a system. Further, at a process block 504, the process 500 generates, prior to runtime, a statically precompiled database for the device that provides a first set of error handling data. In addition, at a process block 506, the process 500 identifies, during runtime, a second device that is added to the system. At a process block 508, the process 500 generates, during runtime, a dynamically allocated database for the second device that provides a second set of error handling data.

Figure 6:
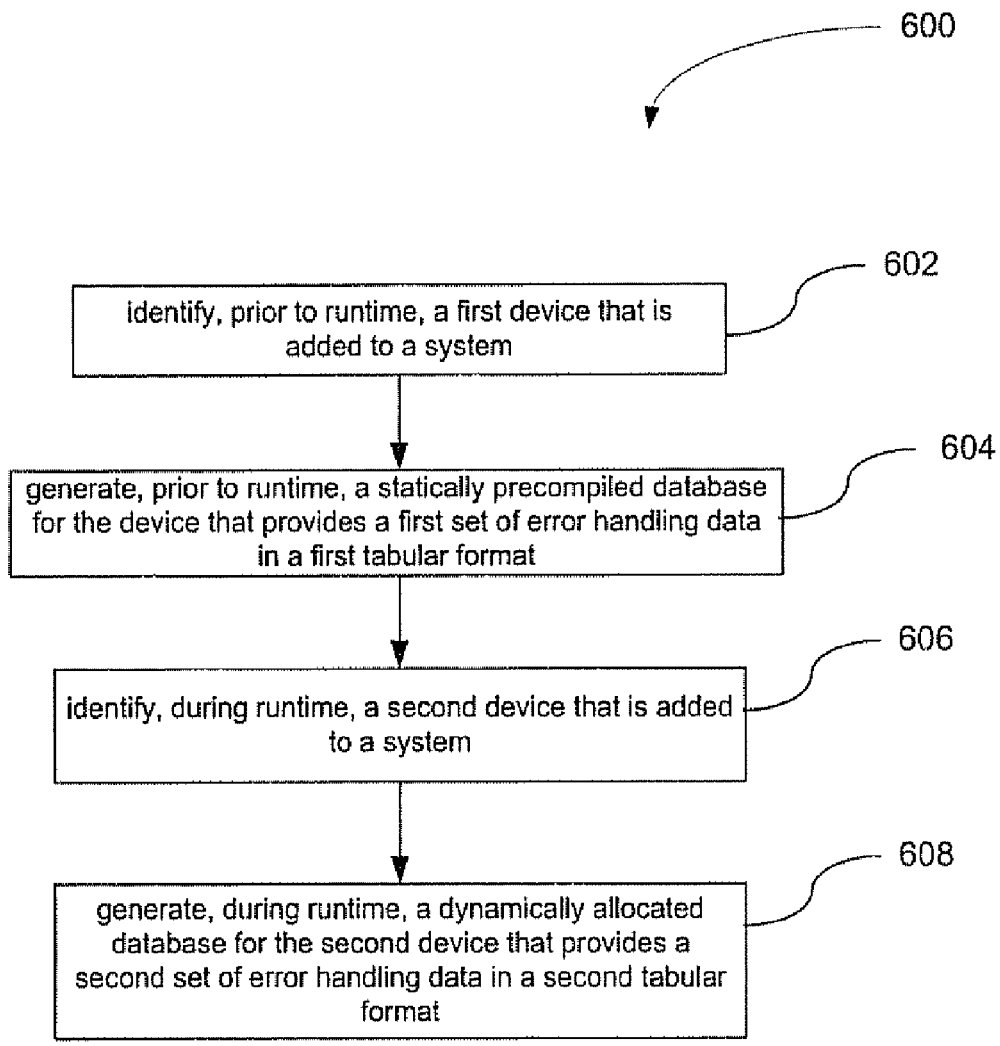
FIG. 6 illustrates another process that generates a statically precompiled database and a dynamically allocated database.

FIG. 6 illustrates another process 600 that generates a statically precompiled database and a dynamically allocated database. At a process block 602, the process 600 identifies, prior to runtime, a first device that is added to a system. Further, at a process block 604, the process 600 generates, prior to runtime, a statically precompiled database for the device that provides a first set of error handling data in a first tabular format. In addition, at a process block 606, the process 600 identifies, during runtime, a second device that is added to a system. Finally, at a process block 608, the process 600 generates, during runtime, a dynamically allocated database for the second device that provides a second set of error handling data in a second tabular format.

Figure 7:
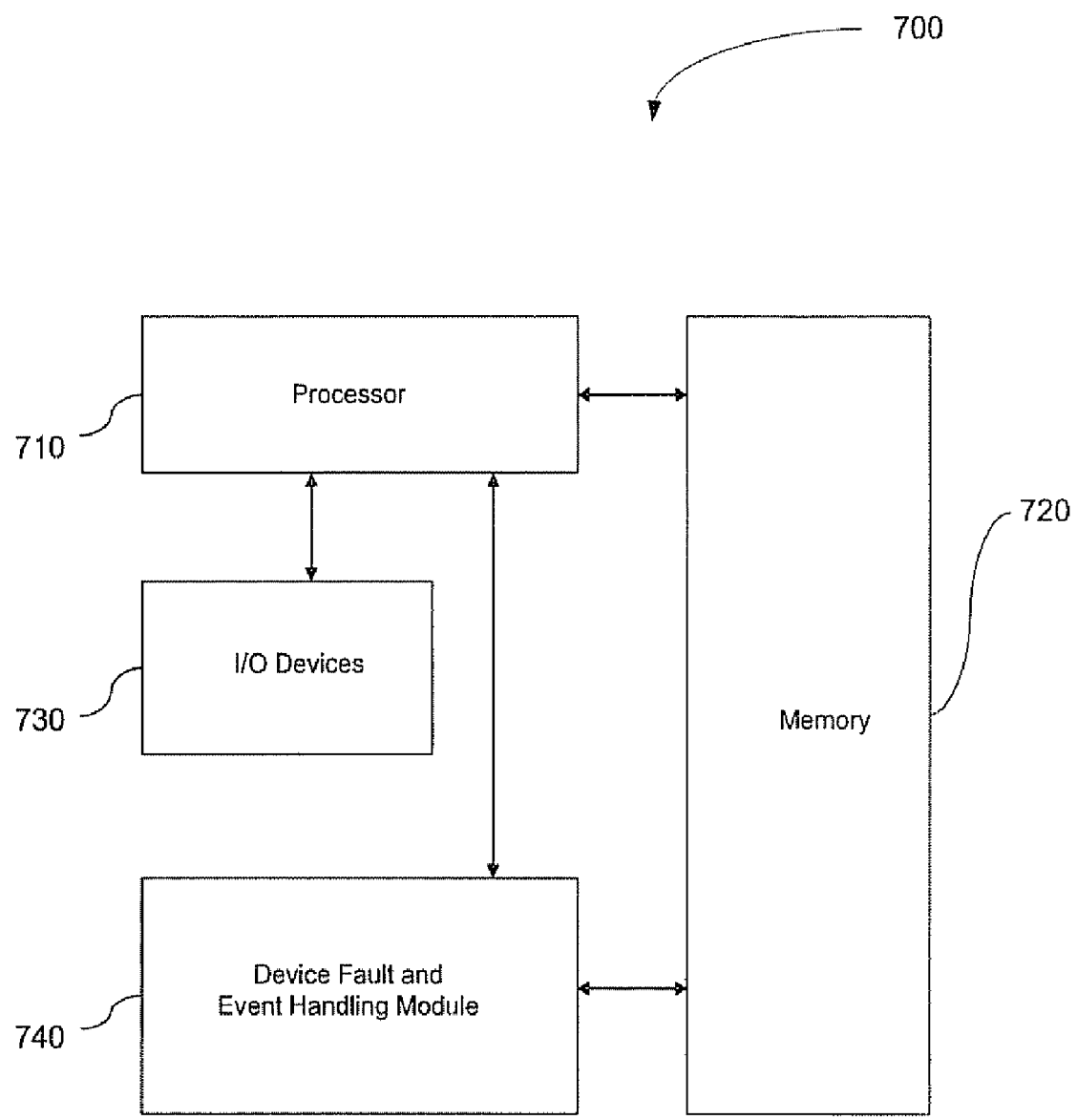
FIG. 7 illustrates a block diagram of a station or system that implements simplified control for device fault and event handling.

FIG. 7 illustrates a block diagram of a station or system 700 that implements simplified control for device fault and event handling. In one embodiment, the station or system 700 is implemented using a general purpose computer or any other hardware equivalents. Thus, the station or system 700 comprises a processor 710, a memory 720, e.g., random access memory ("RAM") and/or read only memory (ROM), a device fault and event handling module 740, and various input/output devices 730, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the device fault and event handling module 740 may be implemented as one or more physical devices that are coupled to the processor 710 through a communication channel. Alternatively, the device fault and event handling module 740 may be represented by one or more software applications (or even a combination of software and hardware, e.g., using application specific integrated circuits (ASIC)), where the software is loaded from a storage medium, (e.g., a magnetic or optical drive or diskette) and operated by the processor in the memory 720 of the computer. As such, the device fault and event handling module 740 (including associated data structures) of the present invention may be stored on a computer readable medium, e.g., RAM memory, magnetic or optical drive or diskette and the like.

It is understood that the simplified control for device fault and event handling described herein may also be applied in other types of systems. Those skilled in the art will appreciate that the various adaptations and modifications of the embodiments of this method and apparatus may be configured without departing from the scope and spirit of the present method and system. Therefore, it is to be understood that, within the scope of the appended claims, the present method and apparatus may be practiced other than as specifically described herein.

I claim:

1. A method comprising:
   identifying, during runtime, a device that is added to a system;
   generating, during runtime, a dynamically allocated database for the device that provides error handling data in a tabular format, and
   accessing a hardware interface database, during runtime, to retrieve hardware specific data regarding the device for inclusion in the error handling data.

2. The method of claim 1, wherein the tabular format includes a data field for an event error identification.

3. The method of claim 1, wherein the tabular format includes a data field for an event control type.

4. The method of claim 1, wherein the tabular format includes a data field for threshold count, reset count, or timer count.

5. The method of claim 1, wherein the tabular format includes a data field for an error message.

6. The method of claim 1, wherein the tabular format includes a data field for an alarm event generation control.

7. The method of claim 1, further comprising linking the hardware interface database with the dynamically allocated database.

8. A method comprising,
identifying, prior to runtime, a first device that is added to a system;
generating, prior to runtime, a statically precompiled database for the device that provides a first set of error handling data;
identifying, during runtime, a second device that is added to the system; and
generating, during runtime, a dynamically allocated database for the second device that provides a second set of error handling data.

9. The method of claim 8, wherein the first set of error handling data is provided in a tabular format.

10. The method of claim 8, wherein the second set of error handling data is provided in a tabular format.

11. The method of claim 8, further comprising accessing a hardware interface database, prior to runtime, to retrieve hardware specific data regarding the first device for inclusion in the first set of error handling data.

12. The method of claim 11, further comprising linking the hardware interface database with the statically precompiled database.

13. The method of claim 8, further comprising accessing a hardware interface database, during runtime, to retrieve hardware specific data regarding the device for inclusion in the second set of error handling data.

14. The method of claim 13, further comprising linking the hardware interface database with the dynamically allocated database.

15. A method comprising,
identifying, prior to runtime, a first device that is added to a system;
generating, prior to runtime, a statically precompiled database for the device that provides a first set of error handling data in a first tabular format;
identifying, during runtime, a second device that is added to the system; and
generating, during runtime, a dynamically allocated database for the second device that provides a second set of error handling data in a second tabular format.

16. The method of claim 15, further comprising accessing a hardware interface database, prior to runtime, to retrieve hardware specific data regarding the first device for inclusion in the first set of error handling data.

17. The method of claim 16, further comprising linking the hardware interface database with the statically precompiled database.

18. The method of claim 15, further comprising accessing a hardware interface database, during runtime, to retrieve hardware specific data regarding the device for inclusion in the second set of error handling data.

19. The method of claim 18, further comprising linking the hardware interface database with the dynamically allocated database.

* * * * *